May 29, 1956  J. F. TALAK  2,747,743
FILTER WITH BY-PASS

Filed Sept. 23, 1950  2 Sheets-Sheet 1

INVENTOR.
JOHN F. TALAK
BY
AGENT.

INVENTOR.
JOHN F. TALAK

United States Patent Office 2,747,743
Patented May 29, 1956

2,747,743

FILTER WITH BY-PASS

John F. Talak, Silvis, Ill., assignor to J. I. Case Company, Racine, Wis., a corporation of Wisconsin Application September 23, 1950, Serial No. 186,418

5 Claims. (Cl. 210—177)

This invention relates to a hydraulic system and especially to a means of filtering the hydraulic liquid in such a system.

The object of this invention is to provide a filtering system having a means to release pressure when the filter is clogged with dirt and no longer allows the liquid to flow freely therethrough.

Another object is to provide a pressure release means to protect the system from injury owing to excessive pressure when the liquid has congealed at low temperatures and will not readily flow through the filter element.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

It has been found that the liquid used in hydraulic systems gathers minute particles of dirt, chips and other foreign matter which interferes with proper operation of the control valve. It has been found necessary to provide a means of filtering this liquid so as to remove such foreign particles, thereby obviating expensive delays and repairs.

One method of filtering liquids is to by-pass a portion of the liquid and pass it through the filter. After passing through the filter this portion again mixes with the unfiltered liquid and finally passes to the pump and control. This method relies upon the probability that all the liquid will have ultimately passed through the filter. There is, however, a possibility that some particles of dirt or other foreign matter may not be filtered out of the liquid before the latter reaches the control valve where it may seriously impair the functions of the latter.

The method of filtering embraced by this invention is to pass all the liquid through the filter thus trapping any foreign particles before they can reach vital parts of the mechanism, thus protecting the system against costly delays and repairs. This invention especially concerns tractors which employ a portion of the torque tube as a reservoir for the hydraulic liquid, thus effecting a saving in cost and eliminating an encumbrance in the form of a separate reservoir. However, this invention is adaptable to hydraulic systems having separate reservoirs which adaptation would be within the knowledge of one skilled in the art.

A problem arises when completely filtering the liquid in a hydraulic system by a failure of the liquid to flow through the filter element at low temperatures because of congealing, with the result that the pressure rises to a point where damage is done to the element or to the system in general.

When this invention is employed there is no danger of damage to the system owing to the fact that an increase in pressure allows the liquid to flow unimpeded from the inner bore of the filter element to the reservoir, until such time as the pressure again drops to the normal amount.

Referring to the drawings.

Figure 1:
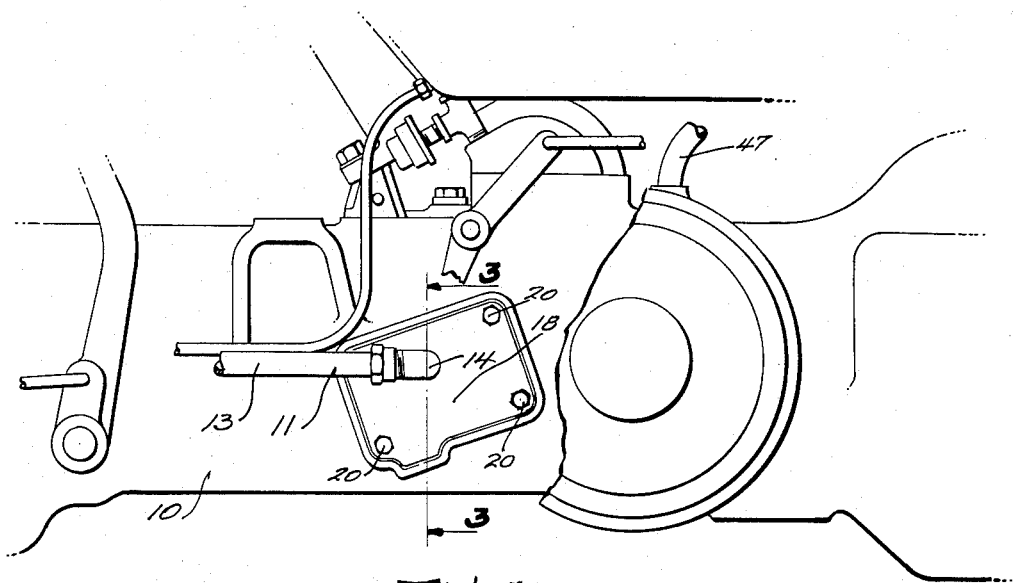
Fig. 1 is a fragmentary, right side, elevational view of a tractor torque tube showing a liquid inlet communicating with the reservoir.

Referring to the drawings, 10 is the torque tube portion of a tractor provided with a liquid return 11 which communicates with a reservoir 12. Other details of the drawings which are of importance will be described as the occasion arises.

Figures 2, 3:
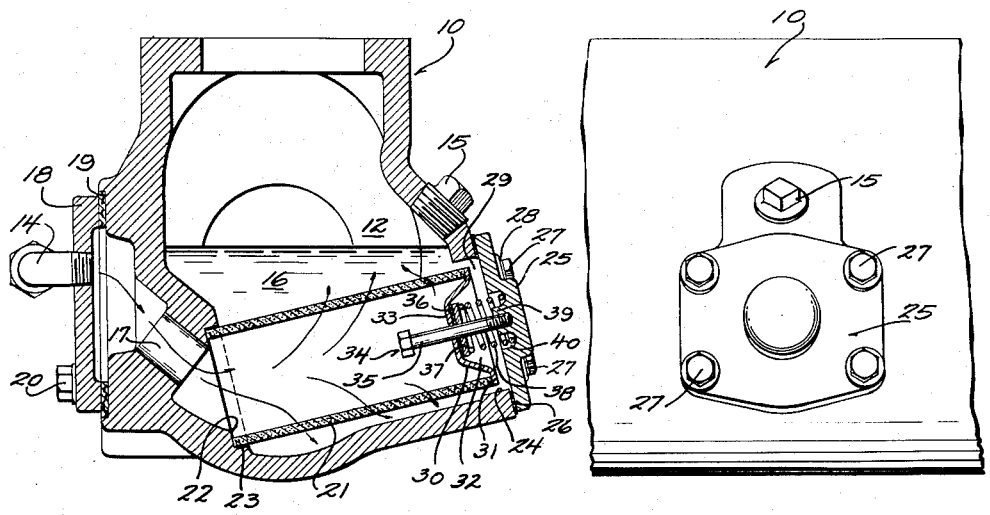
Fig. 2 is a fragmentary view of the opposite side of the torque tube.
Fig. 3 is a section taken at 3—3 of Fig. 1.

Referring to Figs. 1 and 3 liquid return 11 comprises tubing 13 of copper or other suitable material which extends from a lifting ram not shown, and terminates in an elbow fitting 14. Tubing 13 and fitting 14 are conventional and are arranged to suit the design of the system. Reservoir 12 is provided with a threaded plug 15 which is positioned at the maximum level of liquid 16 in the reservoir which plug can be removed for filling and inspecting in order to maintain a proper quantity of liquid for the operation of the system.

A liquid return passage 17 is provided in torque tube 10 and which communicates with the liquid return 11. A plate 18 is provided to entirely cover the passage 17. A gasket 19 is interposed between the torque tube 10 and plate 18, and a plurality of cap screws 20 serve to maintain a leak proof seal between the torque tube 10 and plate 18. Plate 18 is provided with a conventional threaded hole into which elbow fitting 14 is assembled in liquid tight relation.

The filtering element 21 with which this invention is concerned is of the conventional edge-filtration type made in a cylindrical form. This element is usually made up of sheets of paper-like material pressed into a unit. The liquid being filtered, passes radially from the inside bore of the element to the outside thereof through the interstices between the layers. The filtering element 21 need not be further described as it is a commercially obtainable product.

A seat 22 is provided in the reservoir 12 surrounding the passage 17. Seat 22 is annular and of a diameter to allow free fitting therein of the filter element 21, and is accurately machined to provide a tight seal for the end of the element 21. Reservoir 12 has a cylindrical cavity 23 normal to the seat 22 and which prevents the element 21 from being laterally displaced by the pressure of the hydraulic liquid, or vibration.

As shown in Fig. 3 filter element 21 is disposed at an angle upwardly from the seat 22. The purpose of the angular mounting being to trap sediment, chips, and other particles at a point where they can be removed, thus preventing them from being carried out over the upper end of the filter element, and into the reservoir. The above mentioned sediment, chips, and other particles will accumulate adjacent surface 22.

Filter element 21 extends to a point as shown; reservoir 12 being provided with an aperture 24 of a diameter substantially larger than that of the filter element in order to provide sufficient space for the flow of liquid around the end of the element 21.

A cover 25 having a machined surface is provided for the aperture 24, the torque tube 10 being also provided with a machined surface. A gasket 26 is placed between the above mentioned machined surfaces, and cap screws 27 or other means of fastening the cover 25, assure a liquid tight seal against leakage. Lock washers 28 prevent screws 27 from being loosened by vibration. A space 29 is provided between the end of the filter element 21 and the cover 25 for a purpose hereinafter made clear.

A pressure release cap 30, shown in Fig. 3, is provided and completely closes the end of the tubular filter. Cap 30 is provided with an annular rim surface 31 which seats upon the end surface of the filter element 21 and provides a substantial liquid tight seal. As shown in Fig. 3 cap 30 is provided with a cupped portion 32 having an opening thereof facing the cover 25. The cup portion 32 is cone shaped and converges toward the bottom 33.

A guide 34 extends co-axially with the element 21 and cap 30, the latter being provided with a hole to accommodate the guide shank 35, which is provided with a threaded portion threadedly engaged with the cover 25. Guide 34 extends a substantial distance into filter element 21 beyond the bottom 33 of cup 30. The purpose of the above extension is to enable one who is assembling the cover, with the cap attached, to see that cap 30 seats properly before the cover 25 is in place.

Figure 4:
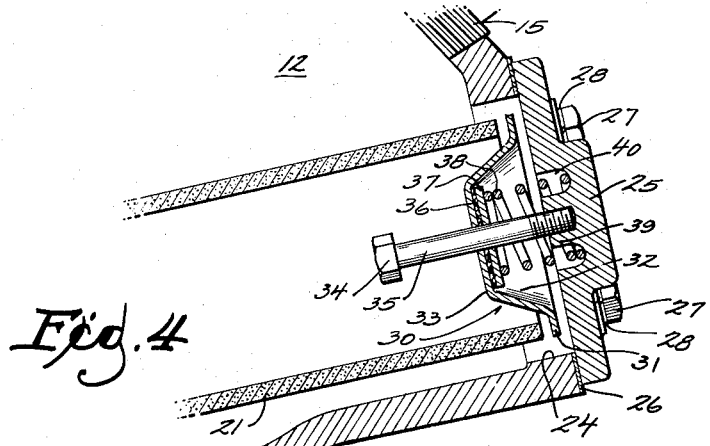
Fig. 4 is a fragmentary view similar to Fig. 3, with the liquid pressure released.

A felt washer 36 is fitted in the bottom of cup portion 32 to provide a seal and which washer is provided with a centrally located hole to receive the guide shank 35. A metal washer 37 co-extensive with washer 36 is placed upon the latter in the bottom of cup portion 32. A compression spring 38 is assembled with one end thereof resting against the washer 37 and the other end resting against the cover 25. Cover 25 is provided with a boss 39, and an annular cavity 40 serves as a guide for spring 38. Compression spring 38 is calibrated so as to allow the cap 30 to be lifted from its seat on the end of the filter element 21 as shown in Fig 4, whenever the pressure within the element exceeds the calibrated amount. In the present instance the spring 38 is calibrated to release the pressure at 8 pounds per square inch. A sufficient space is provided between the end of filter element 21 and the cover 25 so that liquid can flow freely over the end of element 21 when cap 30 has been lifted by the excessive pressure within the element 21.

Figure 5:
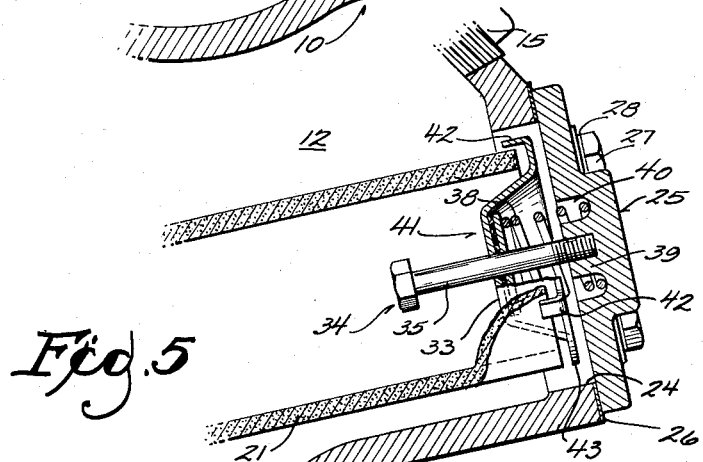
Fig. 5 is a modification showing retaining lugs on the pressure release cap.

Fig. 5 shows the invention provided with a modified form of pressure release cap 41. This modification may be desirable in installations subject to considerable vibration wherein the filter element may be dislodged from its seat when the cap 41 has lifted. In this instance cap 41 is similar in design to that before described with the exception that a plurality of lugs 42, 3 in this instance, are positioned about the periphery of the annular portion 43. The purpose of lugs 42 is to generally confine filter element 21 to a position coaxial with the cap 41 to assure proper seating between filter element 21 and cap 41 after the latter has been lifted and returns to its seat on the filter element 21.

Figure 6:
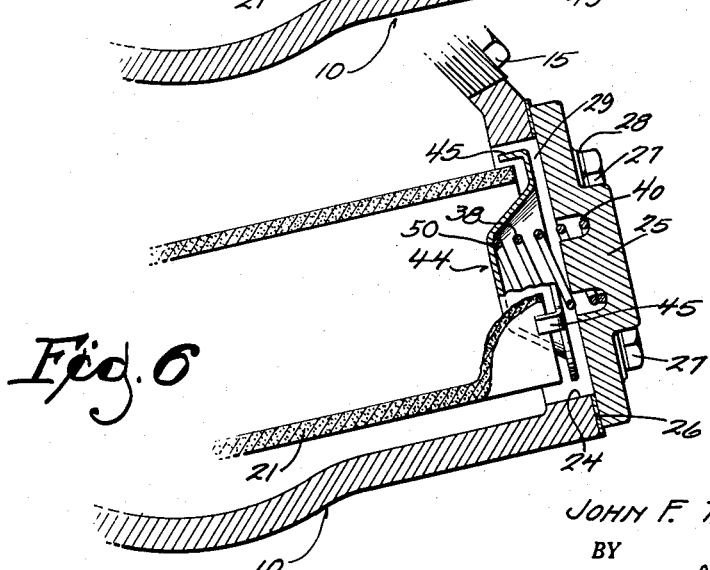
Fig. 6 is a modification omitting the guide member in the center of the cap.

Another modification is shown in Fig. 6 in which the guide 34 has been omitted. There may be instances where such omission may be permissible and which simplifies the construction. Cap 44 is made similarly to that shown in Fig. 5 with the exception that the guide 34 and the hole in cap 44 to accommodate the guide is omitted. The felt washer 36 and metal washer 37 are not needed in this instance which will be clearly seen by reference to Fig. 6.

A plurality of lugs 45 are provided similarly to lugs 42 shown in Fig. 5 and serve the same purpose, namely to assure proper seating of the cap 44 on filter element 21. Spring 38 functions similarly to that shown in Fig. 3. However, in order to facilitate assembling, the cap 44 and spring 38 are secured together by brazing, welding or other suitable means as at 50.

A conduit 47 shown in Fig. 1 is provided as a means of withdrawing liquid from the reservoir 12 and extends to a pump not shown. Conduit 47 extends into the liquid in the reservoir, and as it does not concern the specific invention, will not be further described.

It will be seen that what has been provided is a filter for hydraulic liquid which will release the pressure when the liquid has congealed or when the filter element has become clogged with dirt and other particles. In either instance damage could be caused to the system by the increase in pressure when the liquid fails to pass through the filter element.

The above being a complete description of an illustrative embodiment of the invention, what is claimed as new and desired to be secured by Letters Patent of the United States is:

1. In a hydraulic system for a tractor having a liquid reservoir in the torque tube, a tubular filter element of the edge-filtration type in said reservoir having an inner bore and an inner and outer end, said reservoir provided with an annular seat coacting with said inner end of said element, and having a liquid inlet communicating with said inner bore, said reservoir provided with an aperture freely surrounding said outer end of said element, a cover for said aperture secured to said reservoir and spaced from said outer end of said element, a filter cap seated upon and covering said outer end of said element, a guide for said cap co-axial with said element and threadedly engaged with said cover, said cap provided with a cup shaped cavity the opening thereof facing said cover, a liquid seal washer in said cavity surrounding said guide, a covering washer over said liquid seal washer, a compression spring intermediate said cover and said covering washer to maintain said cap in contact with said element against a predetermined liquid pressure within said element.

2. In a hydraulic system having a liquid reservoir in the torque tube, a tubular filter element in said reservoir having an inner bore and an inner and outer end, said reservoir provided with a seat to accommodate said inner end of said element, said reservoir provided with a liquid inlet communicating with said inner bore and an aperture freely surrounding said outer end of said element, a cover secured to said reservoir and spaced from said outer end of said element, a filter cap seated upon said outer end of said element and provided with ears spaced from said element and extending parallel to the exterior of said element to prevent lateral displacement of said cap relative to said element, said cap provided with a central cup-shaped cavity having the opening thereof facing said cover, a compression spring in said cavity making contact with said cap to maintain the latter in contact with said element at liquid pressures up to a predetermined amount.

3. In a hydraulic system for a tractor, having a liquid reservoir in the torque tube, a tubular filter element having an inner bore and an inner and outer end, a seat in said reservoir to accommodate said inner end of said element, said reservoir provided with a cover secured to said reservoir and spaced from said outer end of said element, a pressure release cap seated solely upon said outer end of said element, means to maintain said cap in liquid-sealing contact with said element, said cap provided with peripherally-spaced projections confining said element in axial alignment with said cap and a cup-shaped cavity having the opening thereof directed toward said cover, a resilient element abutting said cover and the bottom of said cavity thereby maintaining contact between said cap and said filter element against a predetermined liquid pressure within said element.

4. In a hydraulic system having a tubular filter element of the edge-filtration type, a means of releasing liquid pressure within said element comprising a cap having a seat resting solely upon one end of said element and liftable therefrom upon an increase in pressure within said element and a plurality of projections on said cap spaced radially from said element and preventing lateral displacement of said cap relative to said element upon axial displacement of said cap from said element, and means to maintain contact between said element and said cap against pressure below a predetermined amount.

5. In a hydraulic system for a tractor having a liquid reservoir in the torque tube, a tubular filter element of the edge-filtration type in said reservoir having an inner bore and an inner and outer end, said reservoir provided with an annular seat co-acting with said inner end of said element and having a liquid inlet communicating with said inner bore, said reservoir provided with an aperture surrounding said outer end of said element, a cover for said aperture secured to said reservoir and spaced from said outer end of said element, a guide for said cap co-axial with said element and threadedly engaged with said cover, siad cap provided with a cup-shaped cavity, the opening thereof facing said cover, a liquid seal washer in said cavity surrounding said guide, a covering washer over said liquid seal washer, a compression spring intermediate said cover and said covering washer to maintain said cap in contact with said element against a predetermined liquid pressure within said element.

References Cited in the file of this patent
UNITED STATES PATENTS

| | | |
|---|---|---|
| 511,798 | Rankine | Jan. 2, 1894 |
| 1,062,793 | Pedleton | May 27, 1913 |
| 1,601,437 | Gustafson et al. | Sept. 28, 1926 |
| 1,869,589 | Fischer | Aug. 2, 1932 |
| 2,145,535 | Vokes | Jan. 31, 1939 |
| 2,183,616 | Korte | Dec. 19, 1939 |
| 2,287,344 | Easton et al. | June 23, 1942 |
| 2,404,621 | Davis | July 23, 1946 |
| 2,422,647 | Vokes | June 17, 1949 |
| 2,577,217 | Stafford | Dec. 4, 1951 |
| 2,597,217 | Zenick | May 20, 1952 |